US012621222B2

(12) United States Patent      (10) Patent No.:    US 12,621,222 B2

Zhang et al.                    (45) Date of Patent:         May 5, 2026

(54) METHOD FOR DETERMINING NETWORK OPTIMIZATION POLICY, APPARATUS, AND SYSTEM

(71) Applicant: Huawei Technologies Co., Ltd., Shenzhen (CN)

(72) Inventors: Huanhuan Zhang, Nanjing (CN); Qi Yu, Hangzhou (CN); Yi Kai, Shenzhen (CN); Mingjie Cai, Shenzhen (CN); Boyuan Yu, Nanjing (CN); Chen Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 18/597,405

(22) Filed: Mar. 6, 2024

(65) Prior Publication Data

US 2024/0214280 A1      Jun. 27, 2024

Related U.S. Application Data

(63) Continuation of application No. PCT/CN2022/116441, filed on Sep. 1, 2022.

(30) Foreign Application Priority Data

Sep. 7, 2021    (CN) .......................... 202111043719.X
Oct. 29, 2021    (CN) .......................... 202111270140.7

(51) Int. Cl.
    *H04L 41/5019*       (2022.01)
    *H04L 47/24*        (2022.01)

(52) U.S. Cl.
    CPC .......... *H04L 41/5019* (2013.01); *H04L 47/24* (2013.01)

(58) Field of Classification Search
    CPC . H04L 41/5019; H04L 47/24; H04L 41/0823; H04L 41/0894; H04L 41/0895; H04L 47/10; H04L 41/142

(Continued)

(56) References Cited

U.S. PATENT DOCUMENTS 10,756,995 B2 *   8/2020   Schibler .............. H04L 63/1433
11,012,872 B1 *   5/2021   Bellamkonda ...... H04L 41/0823

(Continued)

FOREIGN PATENT DOCUMENTS

CN      111294819 A     6/2020
WO     2021007019 A1    1/2021

*Primary Examiner* — Karen C Tang
(74) *Attorney, Agent, or Firm* — Slater Matsil, LLP

(57) ABSTRACT

A method for determining a network optimization policy, an apparatus, and a system are provided. A network optimization device can process a performance parameter of a network and a service requirement of a target service flow by using a network optimization algorithm, to obtain a target network optimization policy, and can apply the target network optimization policy to the target service flow, to enable transmission performance of the target service flow to satisfy the service requirement. Because the network optimization device can automatically determine the network optimization policy based on the network optimization algorithm, efficiency of determining the network optimization policy is effectively improved. In addition, when determining the network optimization policy, the network optimization device further considers the performance parameter of the network.

20 Claims, 6 Drawing Sheets

(58) Field of Classification Search
    USPC .......................................................... 709/224
    See application file for complete search history.

(56) References Cited

U.S. PATENT DOCUMENTS

| | | | | |
|---|---|---|---|---|
| 11,258,657 | B2 * | 2/2022 | Tammana | H04L 41/0677 |
| 11,509,542 | B2 * | 11/2022 | Shirazipour | G06N 3/086 |
| 11,677,681 | B1 * | 6/2023 | Alt | H04L 43/0858 |
| | | | | 709/226 |
| 2014/0222748 | A1 * | 8/2014 | Mermoud | H04L 41/16 |
| | | | | 706/58 |
| 2015/0195149 | A1 * | 7/2015 | Vasseur | H04L 47/2425 |
| | | | | 370/252 |
| 2016/0156520 | A1 | 6/2016 | Scully et al. | |
| 2018/0183683 | A1 | 6/2018 | Geng et al. | |
| 2019/0068467 | A1 * | 2/2019 | Chauhan | G06F 11/008 |
| 2020/0366559 | A1 | 11/2020 | Parvataneni et al. | |
| 2021/0051104 | A1 * | 2/2021 | He | G06N 20/00 |
| 2021/0158106 | A1 * | 5/2021 | Vasseur | H04L 41/147 |
| 2021/0303632 | A1 * | 9/2021 | Parthasarathy | G06F 11/3419 |
| 2021/0344745 | A1 * | 11/2021 | Mermoud | H04L 41/16 |
| 2021/0349657 | A1 * | 11/2021 | Darji | G06F 3/0604 |
| 2021/0409275 | A1 * | 12/2021 | Galchenko | H04L 63/20 |
| 2022/0107817 | A1 * | 4/2022 | Bakshi | G06F 11/3668 |
| 2022/0303796 | A1 * | 9/2022 | Zhang | H04L 41/14 |

* cited by examiner

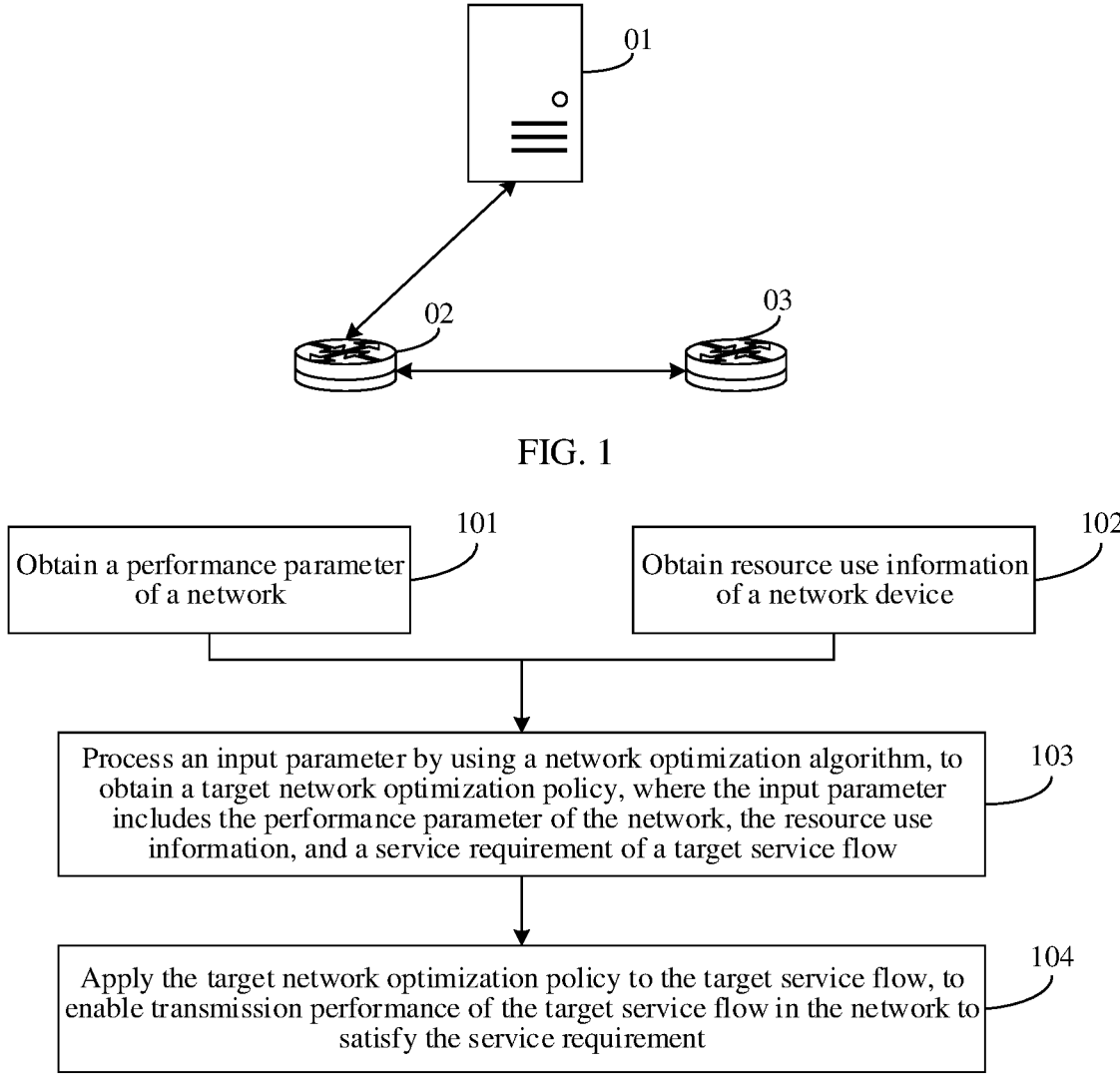

FIG. 1

Obtain a performance parameter of a network  101

Obtain resource use information of a network device  102

Process an input parameter by using a network optimization algorithm, to obtain a target network optimization policy, where the input parameter includes the performance parameter of the network, the resource use information, and a service requirement of a target service flow  103

Apply the target network optimization policy to the target service flow, to enable transmission performance of the target service flow in the network to satisfy the service requirement  104

FIG. 2

Reset

S11

S10

S2

S9

S8

Start up

S1

Continuous optimization

S7

Stable state

S3

S6

S4

The service requirement is not satisfied

S5

Rollback

METHOD FOR DETERMINING NETWORK OPTIMIZATION POLICY, APPARATUS, AND SYSTEM

CROSS-REFERENCE TO RELATED APPLICATIONS

This application is a continuation of International Application No. PCT/CN2022/116441, filed on Sep. 1, 2022, which claims priorities to Chinese Patent Application No. 202111043719.X, filed on Sep. 7, 2021 and Chinese Patent Application No. 202111270140.7, filed on Oct. 29, 2021. All of the aforementioned patent applications are hereby incorporated by reference in their entireties.

TECHNICAL FIELD

This application relates to the communication field, and in particular, to a method for determining a network optimization policy, an apparatus, and a system.

BACKGROUND

A wide area network (WAN) is a communication network that connects local area networks or metropolitan area networks in different areas. To ensure transmission quality of a service flow in a WAN, the WAN usually can provide the following network optimization policies: forward error correction (FEC), compression, multi-feed and selective receiving, per-packet load sharing, jitter buffer, active lost packet retransmission, transmission control protocol (TCP) acceleration, and the like.

In a related technology, an operation and maintenance engineer may configure, in a network device based on a service requirement of a service flow, for example, a requirement defined in the service level agreement (SLA), a network optimization policy that can satisfy the service requirement. Then, the network device may execute the network optimization policy on the service flow. For example, if a service requirement of a service flow is high quality and a high throughput, the network optimization policy configured by the operation and maintenance engineer for the service flow may include FEC. If a service requirement of a service flow is high efficiency, the network optimization policy configured by the operation and maintenance engineer for the service flow may include TCP acceleration.

However, efficiency of the foregoing method for determining and configuring the network optimization policy by the operation and maintenance engineer based on the service requirement is low.

SUMMARY

This application provides a method for determining a network optimization policy, an apparatus, and a system, to alleviate low efficiency of configuring a network optimization policy.

According to one aspect, a method for determining a network optimization policy is provided, applied to a network optimization device, where the method includes: obtaining a performance parameter of a network, and processing an input parameter by using a network optimization algorithm, to obtain a target network optimization policy, where the input parameter includes the performance parameter of the network and a service requirement of a target service flow; and then applying the target network optimization policy to the target service flow, to enable transmission performance of the target service flow in the network to satisfy the service requirement.

Because the network optimization device can automatically determine the network optimization policy based on the network optimization algorithm, efficiency of determining the network optimization policy is effectively improved. In addition, when determining the network optimization policy, the network optimization device not only considers the service requirement of the service flow, but also considers the performance parameter of the network. Therefore, the determined network optimization policy can adapt to a dynamic change of network performance.

Optionally, the process of obtaining a performance parameter of a network may include: obtaining a performance parameter of a link through which the target service flow is to pass in the network.

Because the performance of the link through which the target service flow is to pass is a key factor that affects the transmission performance of the target service flow, when the target network optimization policy is determined, only the performance parameter of the link through which the target service flow is to pass in the network may be obtained. Therefore, while ensuring accuracy of the determined target network optimization policy, a data volume of data that needs to be processed by the network optimization device can be reduced, and data processing efficiency can be improved.

Optionally, the process of processing the performance parameter of the network and a service requirement of a target service flow by using a network optimization algorithm, to obtain a target network optimization policy may include: processing the input parameter by using the network optimization algorithm, to select at least one network optimization technology from a plurality of different network optimization technologies, to obtain the target network optimization policy.

The plurality of different network optimization technologies may include at least two of the following technologies: an FEC technology, a compression technology, a multi-feed and selective receiving technology, a per-packet load sharing technology, a jitter buffer technology, an active lost packet retransmission technology, a TCP acceleration technology, and the like.

Optionally, the input parameter may further include: first temporary transmission performance of the target service flow obtained after a temporary network optimization technology is applied to the target service flow, where the temporary network optimization technology belongs to the plurality of different network optimization technologies; and correspondingly, the process of selecting at least one network optimization technology from a plurality of different network optimization technologies, to obtain the target network optimization policy may include: selecting, from the plurality of different network optimization technologies if the first temporary transmission performance does not satisfy the service requirement, at least one network optimization technology different from the temporary network optimization technology, to obtain the target network optimization policy.

After applying the temporary network optimization technology to the target service flow, the network optimization device may further adjust, based on actual transmission performance of the target service flow in the network, the network optimization technology applied to the target service flow, to ensure that an adjusted network optimization technology (that is, the target network optimization policy) can enable the transmission performance of the target service flow to satisfy the service requirement. Therefore, the network optimization policy applied to the target service flow can be adaptively adjusted, to ensure that in a process in which the network performance dynamically changes, the transmission performance of the target service flow can always satisfy the service requirement.

Optionally, the process of processing the performance parameter of the network and a service requirement of a target service flow by using a network optimization algorithm, to obtain a target network optimization policy may include: processing the input parameter by using the network optimization algorithm, to select a group of parameter values from a parameter value range of a network optimization technology, to obtain the target network optimization policy.

In the embodiments described in this application, in addition to selecting the type of the network optimization technology, the network optimization device may further select the parameter value of the network optimization technology, to obtain the target network optimization policy that is finally applied to the target service flow.

Optionally, the input parameter may further include: second temporary transmission performance of the target service flow obtained after the network optimization technology whose parameter value is a first temporary parameter value is applied to the target service flow; and correspondingly, the process of selecting a group of parameter values from a parameter value range of a network optimization technology, to obtain the target network optimization policy may include: adjusting, if the second temporary transmission performance does not satisfy the service requirement, the first temporary parameter value within the parameter value range of the network optimization technology, to obtain the target network optimization policy.

When the temporary transmission performance of the target service flow does not satisfy the service requirement, the network optimization device may further adaptively adjust the parameter value of the network optimization technology applied to the target service flow. Therefore, it can be ensured that in a process in which the network performance dynamically changes, the transmission performance of the target service flow can always satisfy the service requirement.

Optionally, the input parameter may further include: third temporary transmission performance of the target service flow obtained after the network optimization technology whose parameter value is a second temporary parameter value is applied to the target service flow; and correspondingly, the process of selecting a group of parameter values from a parameter value range of a network optimization technology, to obtain the target network optimization policy may include: adjusting, if the third temporary transmission performance is higher than the service requirement, the second temporary parameter value within the parameter value range of the network optimization technology, to obtain the target network optimization policy, where device resources required for executing the network optimization technology whose parameter value is the second temporary parameter value are more than device resources required for executing the target network optimization policy.

When the temporary transmission performance of the target service flow is higher than the service requirement, the network optimization device may also adjust the parameter value of the network optimization technology, to ensure that device resources of a network device consumed by the network optimization policy are reduced as much as possible while satisfying the service requirement. Therefore, more device resources can be released to execute a network optimization policy on another service flow. That is to say, resource utilization of the network device can be effectively improved, and a quantity of service flows that can be carried by the network device can be increased.

Optionally, the input parameter may further include: resource use information of a network device configured to execute the target network optimization policy; and by adding the resource use information to the input parameter, it can be ensured that device resources of the network device are abundant to execute the target network optimization policy. In other words, it can be ensured that the determined target network optimization policy can be effectively executed by the network device.

Optionally, the process in which the network optimization device processes an input parameter by using a network optimization algorithm, to obtain a target network optimization policy may include: inputting the network performance parameter and the service requirement into an optimization model, to obtain one or more different network optimization technologies output by the optimization model, where the target network optimization policy determined based on the network optimization algorithm is determined from the one or more different network optimization technologies.

For example, the network optimization algorithm may further include an online learning algorithm. The network optimization device may select, based on the online learning algorithm, a type of one or more different network optimization technologies output by the optimization model, and/ or a parameter value of a configuration parameter of a network optimization technology, to obtain the target network optimization policy.

Optionally, the optimization model may be obtained by performing training on training samples, and the training samples may include: a reference network optimization policy, a performance parameter of the network before the reference network optimization policy is applied to a reference service flow, and transmission performance of the reference service flow obtained after the reference network optimization policy is applied to the reference service flow.

The optimization model may be obtained through training by the network optimization device, or may be trained by a model trainer and delivered to the network optimization device. In addition, the network optimization device or the model trainer may further periodically update the optimization model, to improve performance of the optimization model.

Optionally, the network optimization device may be the network device configured to execute the target network optimization policy, and correspondingly, the process of applying the target network optimization policy to the target service flow may include: executing the target network optimization policy on the target service flow.

Optionally, the network optimization device may be a controller, and correspondingly, the process of applying the target network optimization policy to the target service flow may include: delivering the target network optimization policy to the network device configured to execute the target network optimization policy, to enable the network device to execute the target network optimization policy on the target service flow.

Each controller may be connected to a plurality of network devices. Therefore, using the controller as a network optimization device can implement centralized calculation of network optimization technologies of service flows that pass through different network devices. In addition, it is convenient to maintain and update the network optimization algorithm.

According to another aspect, a network optimization device is provided. The network optimization device includes at least one module, and the at least one module is configured to implement the method for determining a network optimization policy provided in the foregoing aspect.

According to still another aspect, a network optimization device is provided. The network optimization device includes: a memory, a processor, and a computer program stored on the memory and executable on the processor, where when the processor executes the computer program, the method for determining a network optimization policy provided in the foregoing aspects is implemented.

According to yet another aspect, a computer-readable storage medium is provided. The computer-readable storage medium stores an instruction, and the instruction is executed by a processor to implement the method for determining a network optimization policy provided in the foregoing aspects.

According to yet another aspect, a computer program product including an instruction is provided. When the computer program product is run on a computer, the computer is enabled to perform the method for determining a network optimization policy provided in the foregoing aspects.

According to yet another aspect, a traffic forwarding system is provided. The system includes: a controller and a network device, where the controller is configured to perform the method for determining a network optimization policy provided in the foregoing aspects, and the network device is configured to execute, on a target service flow, a network optimization policy determined by the controller.

Technical effects achieved by the network optimization device, the computer-readable storage medium, the computer program product, and the traffic forwarding system provided in the foregoing aspects are all similar to technical effects achieved by using corresponding technical means in the method for determining a network optimization policy provided in the foregoing aspects, and details are not described herein again.

In conclusion, this application provides a method for determining a network optimization policy, an apparatus, and a system. In a solution provided in this application, a network optimization device can process a performance parameter of a network and a service requirement of a target service flow by using a network optimization algorithm, to obtain a target network optimization policy, and can apply the target network optimization policy to the target service flow, to enable transmission performance of the target service flow to satisfy the service requirement. Because the network optimization device can automatically determine the network optimization policy based on the network optimization algorithm, efficiency of determining the network optimization policy is effectively improved. In addition, when the network optimization policy is determined, the performance parameter of the network is further considered. Therefore, the determined network optimization policy can adapt to a dynamic change of network performance. Therefore, when the network performance dynamically changes, it can also be ensured that the transmission performance of the target service flow satisfies the service requirement.

BRIEF DESCRIPTION OF THE DRAWINGS

FIG. 1 is a schematic diagram of a structure of a traffic forwarding system according to an embodiment of this application;

FIG. 2 is a flowchart of a method for determining a network optimization policy according to an embodiment of this application;

DETAILED DESCRIPTION OF ILLUSTRATIVE EMBODIMENTS

Figure 3:
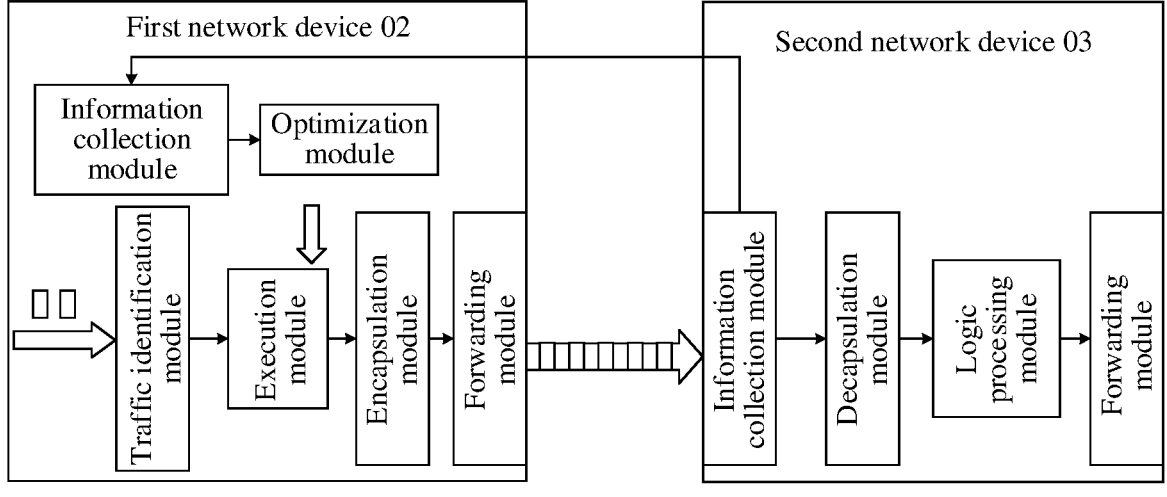
FIG. 3 is a schematic diagram of a structure of another traffic forwarding system according to an embodiment of this application.

The following describes in detail the solutions provided in embodiments of this application with reference to the accompanying drawings.

FIG. 1 is a schematic diagram of a structure of a traffic forwarding system according to an embodiment of this application. As shown in FIG. 1, the system (which may also be referred to as a network) may include a controller 01 and a plurality of network devices. For example, the network devices shown in FIG. 1 include a first network device 02 and a second network device 03. A communication connection is established between the controller 01 and at least one network device (for example, the first network device 02), and a communication connection is established between the network devices.

The controller 01 is configured to perform uniform management and control on each network device connected to the controller, and each network device is configured to forward a packet of a service flow to another network device. For example, an operation and maintenance engineer may configure a network optimization technology for a target service flow in the controller 01, and the controller 01 may deliver the network optimization technology to the first network device 02. Then, the first network device 02 may perform the network optimization technology on the target service flow, and forward a packet of the target service flow to the second network device 03.

The controller 01 may be a server, or a server cluster that includes several servers, or a cloud computing service center. Each of the first network device 02 and the second network device 03 may be a network device that has a packet forwarding function, such as a router or a switch, and may also be referred to as a forwarding device. For example, each of the first network device 02 and the second network device 03 may be an access router (access router, AR).

Optionally, the traffic forwarding system provided in this embodiment of this application may be a wide area network, for example, a software-defined wide area network (software-defined WAN, SD-WAN). Service flows carried in the wide area network are complex and changeable. In addition, there are many network optimization technologies (for example, FEC, compression, multi-feed and selective receiving, per-packet load sharing, jitter buffer, active lost packet retransmission, and TCP acceleration) that can be configured in the wide area network, and configuration parameters of each network optimization technology are diversified. As a result, efficiency of manually configuring a wide area network optimization technology by the operation and maintenance engineer is low. In addition, in a network running process, performance of a link through which the target service flow passes may deteriorate, and consequently, a preconfigured network optimization technology cannot satisfy a service requirement of the target service flow.

An embodiment of this application provides a method for determining a network optimization policy. A network optimization device may process a performance parameter of a network and a service requirement of a target service flow by using a network optimization algorithm, to obtain a target network optimization policy that can be applied to the target service flow. The target network optimization policy may include at least one network optimization technology, or may include at least one network optimization technology and a parameter value of a configuration parameter of the at least one network optimization technology. The network optimization technology may be a wide area network optimization technology. According to the method provided in this embodiment of this application, an operation and maintenance engineer does not need to manually determine and configure a network optimization policy, thereby effectively improving efficiency of determining and configuring a network optimization policy. In addition, when the network optimization policy is determined, the performance parameter of the network is further considered. Therefore, the determined network optimization policy can adapt to a dynamic change of network performance. Therefore, when the network performance dynamically changes, it can also be ensured that the transmission performance of the target service flow satisfies the service requirement.

FIG. 2 is a flowchart of a method for determining a network optimization policy according to an embodiment of this application. The method may be applied to a network optimization device. The network optimization device may be a controller, or may be a network device configured to forward a service flow. As shown in FIG. 2, the method includes:

Step 101: Obtain a performance parameter of a network.

In this embodiment of this application, the performance parameter of the network may include at least one of the following parameters: a delay, a packet loss rate, a jitter, a throughput, and the like. In addition, the performance parameter of the network may be a performance parameter of each link in the network, or may be a performance parameter of a link that a target service flow is to pass through in the network. The target service flow is a service flow to which a network optimization technology needs to be applied, and a quantity of links through which the target service flow is to pass may be greater than or equal to 1. If the quantity of links through which the target service flow is to pass is greater than 1, that is, the target service flow has a plurality of optional links (also referred to as feasible links or reachable links) in the network, the network optimization device may obtain a performance parameter of each optional link.

It may be understood that each service flow in the network may be uniquely identified by using a five-tuple (or a four-tuple or a seven-tuple). Correspondingly, the network optimization device may determine, based on a unique identifier of the target service flow, links through which the target service flow is to pass. The links through which the target service flow is to pass may include a dedicated line link, a common Internet (Internet) link, a mobile communication link, and the like. The mobile communication link may be a fourth generation mobile communication technology (4th generation mobile communication technology, 4G) link, a 5G link, or the like.

Because the performance of the link through which the target service flow is to pass is a key factor that affects the transmission performance of the target service flow, when the target network optimization policy is determined, the network optimization device may obtain only the performance parameter of the link through which the target service flow is to pass in the network. Therefore, while ensuring accuracy of the determined target network optimization policy, a data volume of data that needs to be processed by the network optimization device can be reduced, and data processing efficiency can be improved.

Optionally, as shown in FIG. 3, an information collection module is configured in each network device in a network, and the information collection module may collect a performance parameter of the network in a manner of in-line measurement or active measurement. Description is made below using an example in which the performance parameter of the network is a performance parameter of a link through which a target service flow is to pass, and an example in which a network optimization device is a first network device 02. It is assumed that the link through which the target service flow is to pass is a link between the first network device 02 and a second network device 03. That is to say, the first network device 02 is a transmit-side gateway device of the target service flow, and the second network device 03 is a receive-side gateway device of the target service flow. During in-line measurement, the information collection module in the first network device 02 may encapsulate, in a service packet of the target service flow, tag information (for example, a sending time stamp of the service packet and/or a global sequence number of the service packet), and send the service packet to the second network device 03. During active measurement, the information collection module in the first network device 02 may actively send a probe packet dedicated to measuring the performance parameter to the second network device 03, where tag information is encapsulated in the probe packet.

After receiving the service packet or the probe packet in which the tag information is encapsulated, the information collection module in the second network device 02 may calculate a performance parameter of the link based on the tag information, and feed back the performance parameter obtained through calculation to the first network device 02.

For example, the second network device 02 may calculate a packet loss rate and a throughput of the link based on the global sequence number in the packet, and may calculate a delay of the link based on the sending time stamp in the packet. Alternatively, the second network device 02 may feed back a receiving time stamp of the packet to the first network device 02, and the first network device 02 calculates a delay of the link based on the sending time stamp and the receiving time stamp of the packet.

Figure 4:
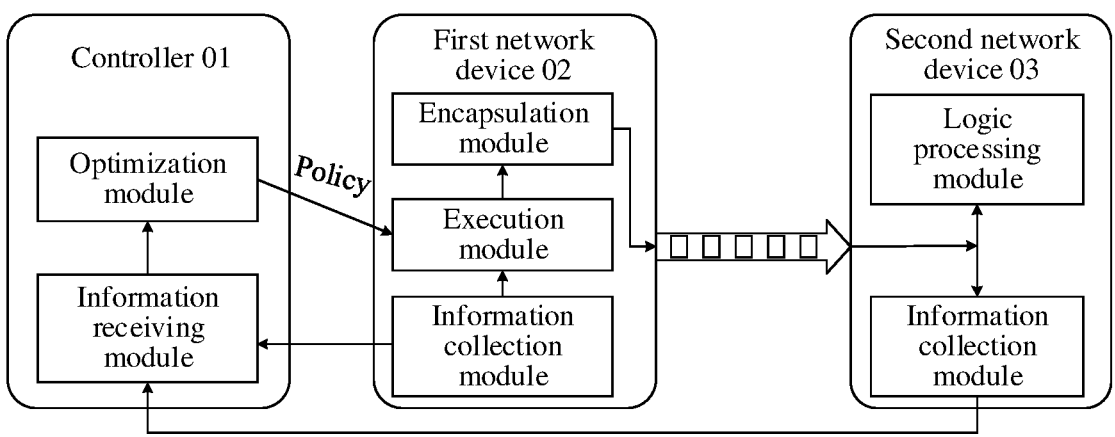
FIG. 4 is a schematic diagram of a structure of still another traffic forwarding system according to an embodiment of this application.

In a scenario in which the network optimization device is a controller, the first network device 01 may send, to the second network device 02, the service packet or the probe packet in which the tag information is encapsulated. In addition, as shown in FIG. 4, an information collection module in a first network device 01 may send, to an information receiving module of a controller 01, probe information of a packet, for example, tag information encapsulated in the packet, and/or a quantity of packets in which tag information is encapsulated. After receiving a packet in which tag information is encapsulated, an information collection module in a second network device 02 may also send, to the information receiving module of the controller 01, the probe information of the received packet, for example, a receiving time stamp of the packet, and/or a quantity of received packets in which the tag information is encapsulated. Then, the information receiving module of the controller 01 may calculate a performance parameter of a link based on the probe information sent by the first network device 01 and the second network device 02.

Step 102: Obtain resource use information of a network device.

The network device includes at least a first network device configured to perform a network optimization technology on the target service flow, that is, a transmit-side gateway device of the target service flow. Optionally, the network device may further include a receive-side gateway device (that is, a second network device) of the target service flow in the network.

The resource use information of the network device may include at least one of the following information: a quantity of sessions (session), processor use information, memory use information, and the like. A processor may include one or more of a central processing unit (CPU), a network processing unit (NPU), and a graphics processing unit (GPU). It may be understood that the resource use information may be represented by using a quantity of resources used by the network device, a percentage of used resources, and/or a quantity of remaining available resources.

In a scenario in which the network optimization device is a first network device, referring to FIG. 3, the information collection module of the first network device 02 may collect the resource use information of the first network device. The information collection module of the second network device 03 may send the resource use information of the second network device 03 to the first network device 02.

In a scenario in which the network optimization device is a controller, referring to FIG. 4, the information collection module of the first network device 02 may send the resource use information of the first network device 02 to the information receiving module of the controller 01. The information collection module of the second network device 03 may send the resource use information of the second network device 03 to the information receiving module of the controller 01.

Step 103: Process an input parameter by using a network optimization algorithm, to obtain a target network optimization policy, where the input parameter includes the per-formance parameter of the network, the resource use information, and a service requirement of a target service flow.

In this embodiment of this application, the network optimization algorithm and the service requirement of the target service flow on which network optimization needs to be performed are preconfigured in the network optimization device. The service requirement (which may also be referred to as a performance requirement or a quality of service requirement) may be an SLA requirement or another agreed requirement, and the service requirement may include a requirement for at least one of the following performance parameters: a delay, a packet loss rate, a jitter, a throughput, and the like.

The network optimization device may periodically obtain the performance parameter of the network and the resource use information of the network device, and may periodically process the performance parameter, the resource use information, and the service requirement of the target service flow by using the network optimization algorithm, to obtain the target network optimization policy. In a process in which the network optimization device processes the input parameter by using the network optimization algorithm, at least one network optimization technology may be selected from a plurality of different network optimization technologies, and/or a group of parameter values may be selected from a parameter value range of a network optimization technology, to obtain the target network optimization policy. Each network optimization technology has at least one configuration parameter, and a parameter value range of each network optimization technology may include an optional value range of each configuration parameter of the network optimization technology. Correspondingly, a group of parameter values of each network optimization technology may include a parameter value of at least one configuration parameter of the network optimization technology. It can be learned from the foregoing analysis that the target network optimization policy may include at least one network optimization technology, or the target network optimization policy may include at least one network optimization technology and a parameter value of a configuration parameter of one or more network optimization technologies in the at least one network optimization technology.

Optionally, the plurality of different network optimization technologies may include: an FEC technology, a compression technology, a multi-feed and selective receiving technology, a per-packet load sharing technology, a jitter buffer technology, an active lost packet retransmission technology, a TCP acceleration technology, a layer-7 protocol optimization technology, and the like. The layer-7 protocol optimization technology may include a Hypertext Transfer Protocol (HTTP) optimization technology, a File Transfer Protocol (FTP) optimization technology, and the like. Configuration parameters of the FEC technology may include a code block size, a packet loss rate, a redundancy rate, and the like. Configuration parameters of the compression technology may include a compression algorithm type, a sliding window size, and the like. Configuration parameters of the multi-feed and selective receiving technology may include a reassembly waiting time, a jitter, and the like. Configuration parameters of the per-packet load sharing technology may include a weight of each link, a reassembly waiting time, and the like. Configuration parameters of the jitter buffer technology may include a buffer size, a buffer waiting time, and the like. Configuration parameters of the active lost packet retransmission technology may include a buffer size, a buffer waiting time, a transmit-end packet release waiting time, and the like. Configuration parameters of the TCP acceleration technology may include a congestion window size, a slow start threshold, and the like. Configuration parameters of the HTTP optimization technology may include a resource buffer policy, a data prefetching manner, and the like.

The code block size is a quantity of packets by which two adjacent redundancy packet encoding operations need to be separated. For example, assuming that the code block size is 20, it indicates that a redundancy packet encoding operation is performed once every 20 packets, and one or more redundancy packets may be generated in each redundancy packet encoding operation. The resource buffer policy in the HTTP optimization technology may include a least recently used (LRU) policy, a least frequently used (LFU) policy, and the like.

It may be understood that if the target service flow has a plurality of optional links in the network, after processing the input parameter by using the network optimization algorithm, the network optimization device may not only obtain a network optimization technology (or a network optimization technology and a parameter value of the network optimization technology), but also determine at least one target link from the plurality of optional links. The at least one target link is a link configured to forward the service packet of the target service flow.

It may be further understood that the network optimization device may not perform step 102, and correspondingly, the input parameter may not include the resource use information of the network device.

Step 104: Apply the target network optimization policy to the target service flow, to enable transmission performance of the target service flow in the network to satisfy the service requirement.

After determining the target network optimization policy, the network optimization device may apply the target network optimization policy to the target service flow. The network optimization device considers the performance parameter of the network when determining the target network optimization policy. Therefore, even if network performance dynamically changes, it can be ensured that after the target network optimization policy is applied, transmission performance of the target service flow in the network can still satisfy the service requirement of the target service flow. If the input parameter further includes the resource use information of the network device, it can be ensured that the network device configured to execute the target network optimization policy has abundant device resources to execute the target network optimization policy. In other words, it can be ensured that the determined target network optimization policy can be effectively executed by the network device.

In a scenario in which the network optimization device is a first network device, as shown in FIG. 3, an optimization module and an execution module are configured in the first network device 02. After the optimization module processes the input parameter by using the network optimization algorithm, to obtain the target network optimization policy, the execution module may execute the target network optimization policy on the target service flow. In other words, the execution module may process the service packet of the target service flow by using the target network optimization policy.

In a scenario in which the network optimization device is a controller, as shown in FIG. 4, an optimization module is configured in the controller 01. After processing the input parameter by using the network optimization algorithm to obtain the target network optimization policy, the optimization module may deliver the target network optimization policy to the first network device 02. Then, the execution module of the first network device 02 may execute the target network optimization policy on the target service flow.

The controller may be connected to a plurality of network devices. Therefore, using the controller as a network optimization device can implement centralized calculation of network optimization technologies of service flows that pass through different network devices. In addition, it is convenient to maintain and update the network optimization algorithm.

As shown in FIG. 3, the first network device 02 may further include a traffic identification module, an encapsulation module, and a forwarding module. The traffic identification module is configured to identify a target service flow that requires network optimization. For example, the traffic identification module may identify the target service flow based on a five-tuple of the service flow. The encapsulation module is configured to encapsulate the service packet of the target service flow. For example, the encapsulation module may encapsulate an identifier of the target network optimization policy in the service packet by using the generic routing encapsulation (GRE) protocol. The forwarding module is configured to forward the service packet of the target service flow to the second network device 03. For example, the forwarding module may forward the service packet of the target service flow by using at least one target link.

Still referring to FIG. 3, the second network device 03 further includes a decapsulation module, a logic processing module, and a forwarding module. The decapsulation module is configured to decapsulate the received service packet. The logic processing module is configured to perform logic processing on the service packet, for example, decode the service packet by using a corresponding decoding technology based on the identifier that is of the target network optimization policy and that is encapsulated in the service packet. The forwarding module is configured to forward the service packet obtained after the logic processing to a receive-end device of the target service flow.

Optionally, after step 104, the network optimization device may further continue to perform step 101 to step 103, to update the target network optimization policy. For example, the network optimization device may periodically perform step 101 to step 103; or the network optimization device may perform step 101 to step 103 again when detecting that the performance parameter of the network and/or the resource use information of the network device changes. Based on this, when network performance or a resource use status of the network device changes, the network optimization device can adaptively adjust the network optimization policy applied to the target service flow, to ensure that the service requirement of the target service flow can be satisfied.

Figure 5:
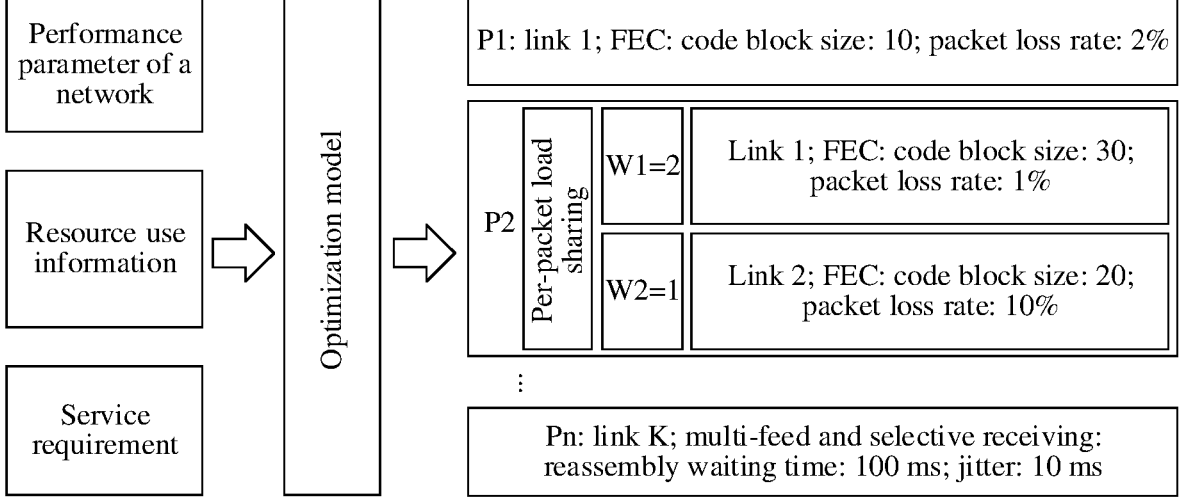
FIG. 5 is a schematic diagram of an input parameter and an output network optimization policy of an optimization model according to an embodiment of this application.

The following describes an implementation process of step 103. As shown in FIG. 5, a network optimization algorithm deployed in a network optimization device includes an optimization model (which may also be referred to as an adaptive model). The network optimization device may input a performance parameter of a network, resource use information of a network device, and a service requirement of a target service flow that are obtained into the optimization model, to obtain one or more different network optimization technologies output by the optimization model. Then, the network optimization device may determine a target network optimization policy from the one or more different network optimization technologies output by the optimization model. For example, the network optimization device may randomly select a network optimization technology to obtain the target network optimization policy.

Optionally, referring to FIG. 5, the optimization model may output at least one network optimization policy. Each network optimization policy includes: an identifier of at least one target link, at least one network optimization technology, and a parameter value of a configuration parameter of each network optimization technology. For example, as shown in FIG. 5, the optimization model may output n network optimization policies, where n is an integer greater than 1.

An identifier of a target link in a network optimization policy P1 is a link 1, a network optimization technology is an FEC technology, and parameter values of the FEC technology include a code block size of 10 and a packet loss rate of 2%. A network optimization technology in a network optimization policy P2 includes a per-packet load sharing technology, and identifiers of target links include a link 1 and a link 2. That is to say, the link 1 and the link 2 are configured to implement per-packet load sharing. Parameter values of the per-packet load sharing technology include: a weight W1 of the link 1 that is equal to 2, and a weight W2 of the link 2 that is equal to 1. In addition, the network optimization technology in the network optimization policy P2 further includes an FEC technology corresponding to each of the link 1 and the link 2. Parameter values of the FEC technology corresponding to the link 1 include a code block size of 30 and a packet loss rate of 1%. Parameter values of the FEC technology corresponding to the link 2 include a code block size of 20 and a packet loss rate of 10%.

An identifier of a target link in a network optimization policy Pn is a link K, a network optimization technology is a multi-feed and selective receiving technology, and parameter values of the multi-feed and selective receiving technology include a reassembly waiting time of 100 milliseconds (ms), and a jitter of 10 ms.

Figure 6:
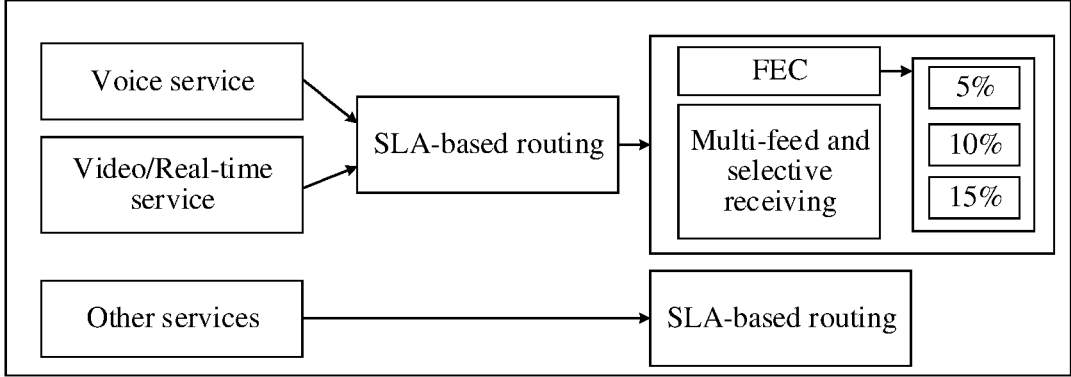
FIG. 6 is a schematic diagram of a working principle of an optimization model according to an embodiment of this application.

Optionally, the optimization model may be a rule-based model, and for different types of service flows, network optimization policies output by the optimization model may include different content. For example, referring to FIG. 6, for a service flow of a target type (a service flow of a voice service and a service flow of a real-time service such as a video service are used as an example in FIG. 6), the optimization model may first select, based on a service requirement of the service flow, a target link for the service flow and at least one network optimization technology. Then, the optimization model may determine a parameter value of a configuration parameter of the network optimization technology based on a performance parameter of a network (or a performance parameter and resource use information of a network device). For example, for an FEC technology, a code block size and a packet loss rate may be determined based on a performance parameter of a link. Correspondingly, for the service flow of the target type, a network optimization policy output by the optimization model may include: an identifier of at least one target link, at least one network optimization technology, and a parameter value of a configuration parameter of each network optimization technology.

For a service flow of another type different from the target type, the optimization model may select a target link for the service flow based on only a service requirement, and does not need to further determine a network optimization technology. Correspondingly, for the service flow of the another type, a network optimization policy output by the optimization model may include only an identifier of at least one target link.

It may be understood that when network performance is good, the network optimization policy that is for the service flow of the target type and that is output by the optimization model may also include only an identifier of at least one target link, but does not include a network optimization technology. Correspondingly, a network optimization device does not need to apply a network optimization technology to the service flow of the target type. Therefore, it can be ensured that when network performance is improved, the network optimization device can disable the network optimization technology for the target service flow in time, thereby effectively releasing a device resource of the network device.

Optionally, a rule for determining, by the optimization model, the network optimization technology based on the input parameter may be determined based on characteristics of different network optimization technologies and with reference to experimental analysis. Table 1 schematically shows characteristics of different network optimization technologies. As shown in Table 1, an FEC technology is a network optimization technology that uses a redundancy packet to conceal a packet loss and reduce a retransmission delay. The FEC technology can further improve a throughput in some scenarios. For example, a throughput of a packet loss link with a large bandwidth-delay product (BDP) or a link with a high non-blocking packet loss rate may be improved. The FEC technology has the following main constraints: introducing extra bandwidth for packet loss concealment, and being inapplicable to link blocking. The non-blocking packet loss is also referred to as a random packet loss, which refers to a packet loss not caused by link blocking.

TABLE 1

| Network optimization technology | FEC | TCP Acceleration | Multi-feed and selective receiving | Per-packet load sharing | Compression |
|---|---|---|---|---|---|
| Delay | Reduce a retransmission delay | Increase a retransmission delay | No impact | No impact | No impact |
| Effective throughput | Packet loss link with a large BDP or link with a high non-blocking packet loss rate, to increase a throughput | Strong competitiveness in congestion control, to increase a throughput | No impact | Increase a throughput | Increase a throughput |

TABLE 1-continued

| Network optimization technology | FEC | TCP Acceleration | Multi-feed and selective receiving | Per-packet load sharing | Compression |
|---|---|---|---|---|---|
| Packet loss | Reduce a packet loss | End-to-end packet loss concealment | Reduce a packet loss | No impact | No impact |
| Purpose | Packet loss concealment | Increase a throughput | High reliability | Increase a throughput | Increase a throughput |
| Technical description | Packet loss concealment for a redundancy packet, to reduce a retransmission delay and increase a throughput in some scenarios | TCP proxy-based implementation, a non-blocking packet loss scenario, to introduce a retransmission delay | Multi-link copy backup for a key service, to improve availability | Load balancing in packet granularity, to use remaining bandwidth of a plurality of links to increase a single-flow throughput | Compress duplicate data in a big flow to increase valid data |
| Constraints | Introduce extra bandwidth for packet loss concealment, and be inapplicable to link blocking | Packet loss scenario, to increase a retransmission delay | Consume 50% extra bandwidth | Small link delay difference between equal-cost routes | Unstable effect, related to an upper-layer application |

It can be further learned from Table 1 that, each of the TCP acceleration technology, the per-packet load sharing technology, and the compression technology mainly aims to increase a throughput, and the multi-feed and selective receiving mainly aims to achieve high reliability. In addition, it may be understood that different network optimization technologies may have different limitations on the number of sessions. For example, if a limitation of a network optimization technology on the number of sessions is M (M is an integer greater than 1), it indicates that the network device can execute the network optimization technology for a maximum of M service flows simultaneously. For example, a limitation M of the FEC technology on the number of sessions may be 32.

Figures 7, 8:
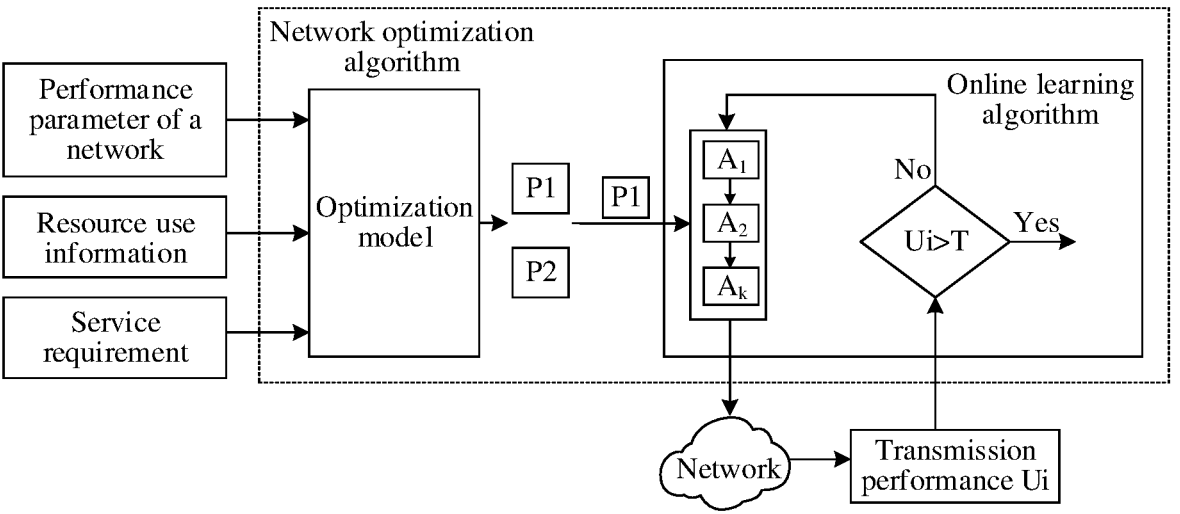
FIG. 7 is a schematic diagram of a working principle of a network optimization algorithm according to an embodiment of this application.
FIG. 8 is a schematic diagram of a state machine according to an embodiment of this application.

It may be understood that it may be difficult for precision of the foregoing rule-based optimization model to satisfy requirements of some complex network scenarios. To improve precision of the determined network optimization policy, as shown in FIG. 7, the network optimization algorithm may further include an online learning algorithm. The online learning algorithm can select, based on transmission performance of a target service flow in a network, at least one network optimization technology from a plurality of different network optimization technologies output by the optimization model, to obtain a target network optimization policy, and/or select a group of parameter values from a parameter value range of a network optimization technology output by the optimization model, to obtain a target network optimization policy. In other words, a network optimization device can select, by using the online learning algorithm, a type of a network optimization technology output by the optimization model and/or a parameter value of the network optimization technology, to obtain a final target network optimization policy. The transmission performance of the target service flow in the network may be represented by using at least one of the following performance parameters: a delay, a packet loss rate, a jitter, a throughput, and the like.

In a first possible implementation, in a scenario in which the optimization model outputs a plurality of different network optimization technologies, an input parameter processed by the network optimization algorithm may further include first temporary transmission performance of the target service flow obtained after a temporary network optimization technology is applied to the target service flow. The temporary network optimization technology belongs to the plurality of different network optimization technologies. Correspondingly, a process in which the network optimization device determines the target network optimization policy by using the online learning algorithm may include: selecting, from the plurality of different network optimization technologies output by the optimization model if the first temporary transmission performance does not satisfy the service requirement of the target service flow, at least one network optimization technology different from the temporary network optimization technology, to obtain the target network optimization policy.

Optionally, the network optimization device may select another network optimization technology different from the temporary network optimization technology, to obtain the target network optimization policy. Alternatively, the network optimization device may select another network optimization technology different from the temporary network optimization technology, and combine the temporary network optimization technology and the another network optimization technology, to obtain the target network optimization policy. That is to say, the network optimization device may apply a plurality of network optimization technologies to the target service flow.

For example, it is assumed that for a target service flow, network optimization technologies output by the optimization model include an FEC technology and a multi-feed and selective receiving technology. If the first temporary transmission performance of the target service flow in the network does not satisfy the service requirement after the network optimization device applies the FEC technology as the temporary network optimization technology to the target service flow, the network optimization device may determine the multi-feed and selective receiving technology as the target network optimization policy, and apply the multi-feed and selective receiving technology to the target service flow. Alternatively, the network optimization device may determine a combination of the FEC technology and the multi-feed and selective receiving technology as the target network optimization policy, and separately apply the FEC technology and the multi-feed and selective receiving technology to the target service flow.

In the first possible implementation, after applying the temporary network optimization technology to the target service flow, the network optimization device may further adjust, based on actual transmission performance (that is, temporary transmission performance) of the target service flow in the network, the network optimization technology applied to the target service flow, so that it can be ensured that an adjusted network optimization technology (that is, the target network optimization policy) can enable the transmission performance of the target service flow to satisfy the service requirement. Therefore, the network optimization policy applied to the target service flow can be adaptively adjusted, to ensure that in a process in which the network performance dynamically changes, the transmission performance of the target service flow can always satisfy the service requirement.

In a second possible implementation, in a scenario in which the optimization model outputs a network optimization technology, an input parameter processed by the network optimization algorithm may further include second temporary transmission performance of the target service flow obtained after the network optimization technology whose parameter value is a first temporary parameter value is applied to the target service flow. Correspondingly, a process in which the network optimization device determines the target network optimization policy by using the online learning algorithm may include: adjusting, if the second temporary transmission performance does not satisfy the service requirement of the target service flow, the first temporary parameter value within the parameter value range of the network optimization technology, to obtain the target network optimization policy.

The parameter value range of the network optimization technology may be output by the optimization model, and the parameter value range may include an optional value range of each configuration parameter of the network optimization technology. After determining that the second temporary transmission performance does not satisfy the service requirement of the target service flow, the network optimization device may adjust, within an optional value range of a parameter value of at least one configuration parameter, a parameter value of the configuration parameter, until the transmission performance of the target service flow satisfies the service requirement.

For example, assuming that a network optimization technology output by the optimization model is an FEC technology and configuration parameters of the FEC technology includes a code block size and a packet loss rate, parameter value ranges of the FEC technology output by the optimization model may include an optional value range of the code block size and an optional value range of the packet loss rate. Correspondingly, if determining that the second temporary transmission performance does not satisfy the service requirement of the target service flow, the network optimization device may adjust the code block size and/or the packet loss rate until the transmission performance of the target service flow satisfies the service requirement.

In an optional example, when adjusting a parameter value of a configuration parameter, the network optimization device may first adjust the parameter value of the configuration parameter separately in a direction of increasing the parameter value and a direction of decreasing the parameter value, and separately obtain first updated transmission performance of the target service flow after a network optimization technology of increasing the parameter value is applied to the target service flow, and second updated transmission performance of the target service flow after a network optimization technology of decreasing the parameter value is applied to the target service flow. Then, the network optimization device may separately determine a first distance between the first updated transmission performance and the service requirement of the target service flow and a second distance between the second updated transmission performance and the service requirement of the target service flow by using a benefit function (for example, a Mahalanobis distance).

A shorter distance indicates that updated transmission performance is closer to the service requirement. Therefore, if the first distance is less than the second distance, the network optimization device may continue to increase the parameter value within the optional value range of the configuration parameter, until the transmission performance of the target service flow satisfies the service requirement after the network optimization technology of increasing the parameter value is applied to the target service flow. If the second distance is less than the first distance, the network optimization device may continue to decrease the parameter value within the optional value range of the configuration parameter, until the transmission performance of the target service flow satisfies the service requirement after the network optimization technology of decreasing the parameter value is applied to the target service flow.

In another optional example, when adjusting a parameter value of a configuration parameter, the network optimization device may first adjust the parameter value of the configuration parameter in a target direction, and obtain updated transmission performance of the target service flow after a network optimization technology of adjusting the parameter value is applied to the target service flow. If the updated transmission performance is closer to the service requirement of the target service flow than the second temporary transmission performance, the network optimization device may continue to adjust the parameter value in the target direction until the transmission performance of the target service flow satisfies the service requirement after the network optimization technology of adjusting the parameter value is applied to the target service flow. If the updated transmission performance is farther away from to the service requirement of the target service flow than the second temporary transmission performance, the network optimization device may continue to adjust the parameter value in a direction opposite to the target direction until the transmission performance of the target service flow satisfies the service requirement after the network optimization technology of adjusting the parameter value is applied to the target service flow. The target direction may be a direction of increasing the parameter value or a direction of decreasing the parameter value.

In each of the foregoing two examples, the network optimization device may adjust the parameter value of the configuration parameter based on a fixed adjustment proportion. For example, the network optimization device may increase the parameter value to 1.25 times of the original parameter value or decrease the parameter value to 0.75 times of the original parameter value each time.

It may be understood that if the service requirement of the target service flow still cannot be satisfied after the network optimization device adjusts a parameter value of a configuration parameter of a network optimization technology to an upper limit or a lower limit of an optional value range, the network optimization device may process an input parameter by using the network optimization algorithm again, to obtain a target network optimization policy.

It may be further understood that in a scenario in which the optimization model outputs a plurality of network optimization technologies, the network optimization device may determine the target network optimization policy with reference to the first possible implementation and the second possible implementation. For example, if determining that the first temporary transmission performance of the target service flow does not satisfy the service requirement, the network optimization device may first adjust the parameter value of the configuration parameter of the temporary network optimization technology in the foregoing second possible implementation. If the service requirement still cannot be satisfied after the parameter value of the configuration parameter of the temporary network optimization technology is adjusted to an upper limit or a lower limit of the optional value range, the network optimization device may select, in the first possible implementation, at least one network optimization technology different from the temporary network optimization technology, to obtain the target network optimization policy.

For example, as shown in FIG. 7, it is assumed that network optimization technologies output by the optimization model includes two types: P1 and P2. In this case, the network optimization device may first use the network optimization technology P1 as a temporary network optimization technology, and apply the temporary network optimization technology to the target service flow. Then, the network optimization device may detect first temporary transmission performance U1 of the target service flow in the network. If the first temporary transmission performance U1 does not satisfy a service requirement T of the target service flow, the network optimization device may adjust a parameter value of a configuration parameter of the network optimization technology P1 from $A_1$ to $A_2$, and apply the network optimization technology to the target service flow. Then, the network optimization device may detect second temporary transmission performance U2 of the target service flow in the network. If the second temporary transmission performance U2 still does not satisfy the service requirement T, the network optimization device may continue to adjust the parameter value of the configuration parameter of the network optimization technology P1.

If the temporary transmission performance of the target service flow still does not satisfy the service requirement T after the network optimization device adjusts the parameter value of the configuration parameter of the network optimization technology P1 to an upper limit $A_k$, the network optimization device may apply the network optimization technology P2 to the target service flow. If the transmission performance of the target service flow satisfies the service requirement T after the network optimization technology P2 is applied, the network optimization device may use the network optimization technology P2 as the target network optimization policy and continue to apply the target network optimization policy to the target service flow. In FIG. 7, i is a positive integer, k is an integer greater than 1, and Ui represents transmission performance that is of the target service flow and that is obtained by the network optimization device for an $i^{th}$ time.

Optionally, in the second possible implementation, the input parameter may further include: third temporary transmission performance of the target service flow obtained after the network optimization technology whose parameter value is a second temporary parameter value is applied to the target service flow; and a process in which the network optimization device determines the target network optimization policy by using the online learning algorithm may include: adjusting, if the third temporary transmission performance is higher than the service requirement of the target service flow, the second temporary parameter value within the parameter value range of the network optimization technology, to obtain the target network optimization policy. Device resources required for executing the network optimization technology whose parameter value is the second temporary parameter value are more than device resources required for executing the target network optimization policy.

That is to say, in a scenario in which the third temporary transmission performance is higher than the service requirement, the network optimization device may also adjust the second temporary parameter value of the network optimization technology, to ensure that device resources of a network device consumed by the network optimization policy are reduced as much as possible while satisfying the service requirement. Therefore, more device resources can be released to execute a network optimization policy on another service flow. That is to say, resource utilization of the network device can be effectively improved, and a quantity of service flows that can be carried (that is, a quantity of sessions supported) by the network device can be increased.

It may be understood that the network optimization device may adjust the second temporary parameter value based on the foregoing two optional examples, so that after the network optimization technology with the parameter value adjusted is applied to the target service flow, transmission performance of the target service flow satisfies the service requirement and is closer to the service requirement.

In this embodiment of this application, a state machine is further configured in the network optimization device. In a process of determining the target network optimization policy by using the online learning algorithm, the network optimization device may adjust a parameter value of a network optimization technology or switch a type of a network optimization technology based on the state machine. The following uses a state machine shown in FIG. 8 as an example to describe a process in which a network optimization device determines a target network optimization policy.

As shown in FIG. 8, in a start up state, the network optimization device can determine an initial network optimization technology (that is, a temporary network optimization technology) based on an output of an optimization model. In step S1, the network optimization device may apply the temporary network optimization technology to a target service flow. Then, the network optimization device enters a continuous optimization state, and performs step S2 once every adjustment interval, where duration of the adjustment interval may be 1 second. In step S2, the network optimization device may adjust a parameter value of a configuration parameter of the temporary network optimization technology, and detect whether temporary transmission performance of the target service flow satisfies a service requirement after the parameter value is adjusted.

In step S3, if detecting that a pre-state is the start up state and the temporary transmission performance of the current target service flow does not satisfy the service requirement, the network optimization device may perform step S4. In step S4, the network optimization device may select at least one network optimization technology different from the temporary network optimization technology.

In step S5, if detecting that the pre-state is the continuous optimization state and the temporary transmission performance of the current target service flow does not satisfy the service requirement, the network optimization device may enter a rollback state, and perform step S6. In step S6, the network optimization device may restore the parameter value of the configuration parameter of the temporary network optimization technology to a value before the last adjustment. In other words, in a process in which the network optimization device continuously adjusts the parameter value, if the temporary transmission performance of the target service flow can satisfy the service requirement after each of several previous adjustments, but the temporary transmission performance of the target service flow no longer satisfies the service requirement after the last adjustment, the network optimization device may determine that before the last adjustment, the temporary transmission performance of the target service flow is close to the service requirement. Therefore, the parameter value of the configuration parameter of the temporary network optimization technology may be rolled back to the value before the last adjustment, to obtain the target network optimization policy.

As shown in FIG. 8, after step S6, the network optimization device may enter a stable (stable) state, and perform step S7. In step S7, the network optimization device may perform a continuous optimization operation once every check interval, that is, adjust the parameter value once every check interval, and detect whether the transmission performance of the target service flow satisfies the service requirement after the parameter value is adjusted. Duration of the check interval is greater than the duration of the adjustment interval. For example, the check interval may be 5 seconds or 10 seconds. If the transmission performance of the target service flow does not satisfy the service requirement (that is, continuous optimization fails) after the parameter value is adjusted, the network optimization device may perform step S8. In step S8, the network optimization device may roll back the parameter value of the configuration parameter of the currently selected network optimization technology to the value before the last adjustment, and may increase the check interval. For example, the check interval may be increased to twice the original value. Then, the network optimization device may perform a continuous optimization operation based on the increased check interval.

Still referring to FIG. 8, if detecting, in step S9, that a target link through which the target service flow passes is down or performance of the target link continuously deteriorates, the network optimization device in the stable state may enter a reset state, and perform step S11. In step S11, the network optimization device may reselect at least one network optimization technology different from the temporary network optimization technology. It can be learned from FIG. 8 that, if detecting, in step S10, that a target link through which the target service flow passes is down or has performance continuously deteriorating, the network optimization device in the continuous optimization state may also enter the reset state.

Optionally, in this embodiment of this application, the optimization model may be obtained by performing training on a plurality of training samples, for example, may be obtained through training by using a machine learning algorithm (for example, a decision tree or a Bayesian network) or a reinforcement learning algorithm. Each training sample may include: a reference network optimization policy, a performance parameter of the network before the reference network optimization policy is applied to a reference service flow, and transmission performance of the reference service flow obtained after the reference network optimization policy is applied to the reference service flow.

The reference network optimization policy may include at least one network optimization technology, or may include at least one network optimization technology and a parameter value of one or more network optimization technologies in the at least one network optimization technology. The at least one network optimization technology may include: an FEC technology, a compression technology, a multi-feed and selective receiving technology, a per-packet load sharing technology, a jitter buffer technology, an active lost packet retransmission technology, a TCP acceleration technology, and/or the like. Reference service flows in different training samples may be service flows of different types of applications, for example, may be a service flow of a voice service or a service flow of a video service.

Figure 9:
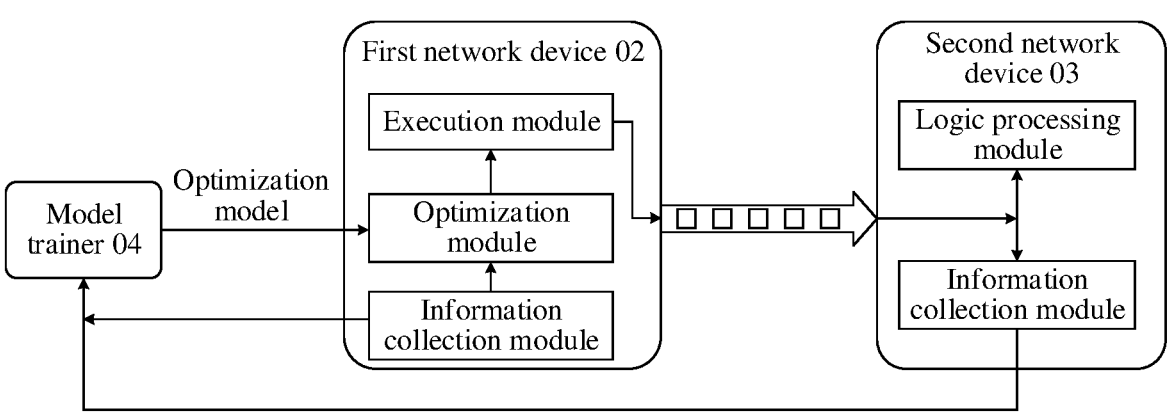
FIG. 9 is a schematic diagram of a structure of yet another traffic forwarding system according to an embodiment of this application.
Figure 10:
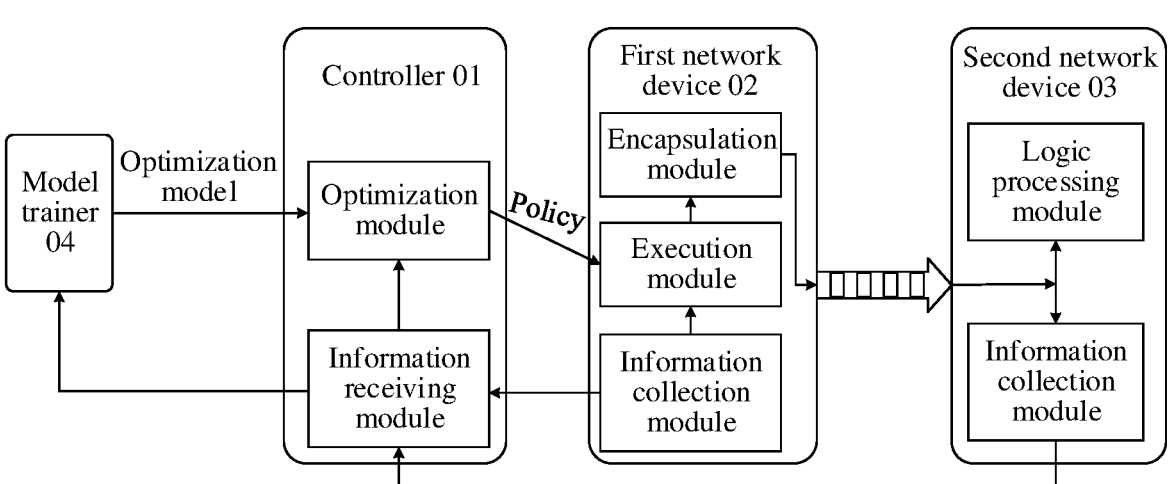
FIG. 10 is a schematic diagram of a structure of yet another traffic forwarding system according to an embodiment of this application.

For example, as shown in FIG. 9 and FIG. 10, the traffic forwarding system may further include a model trainer 04. The model trainer 04 may be one server, a server cluster including several servers, or a cloud computing service center. The model trainer 04 may be configured to: train a plurality of training samples to obtain an optimization model, and deliver the optimization model to the network optimization device. For example, referring to FIG. 9, in a scenario in which the network optimization device is the first network device 02, the model trainer 04 may deliver the optimization model to an optimization module in the first network device 02. Referring to FIG. 10, in a scenario in which the network optimization device is the controller 01, the model trainer 04 may deliver the optimization model to an optimization module in the controller 01.

Referring to FIG. 9 and FIG. 10, it can be learned that each training sample used for model training may be collected by an information collection module in each network device and reported to the model trainer 04, or may be collected by the controller 01 and reported to the model trainer 04.

It may be understood that after obtaining the optimization model through training, the model trainer 04 may further periodically obtain training samples, and update the optimization model based on the obtained training samples. Then, the model trainer 04 may deliver the updated optimization model to the network optimization device, and then the network optimization device may determine a network optimization policy by using the updated optimization model.

It may be further understood that the model trainer 04 may alternatively be integrated into the network optimization device, that is, the network optimization device also has a model training function and a model update function.

It may be further understood that the network optimization algorithm may alternatively be a network optimization model obtained through training by using a machine learning algorithm or a deep learning algorithm. In other words, after inputting an input parameter into the network optimization model, the network optimization device may obtain a target network optimization policy output by the network optimization model.

Optionally, a sequence of steps of the method provided in this embodiment of this application may be properly adjusted, or a step may be correspondingly added or deleted based on a situation. For example, step 102 may be performed before step 101, or the network optimization device may not need to perform step 102.

In conclusion, an embodiment of this application provides a method for determining a network optimization policy. A network optimization device can process a performance parameter of a network and a service requirement of a target service flow by using a network optimization algorithm, to obtain a target network optimization policy, and can apply the target network optimization policy to the target service flow, to enable transmission performance of the target service flow to satisfy the service requirement. Because the network optimization device can automatically determine the network optimization policy based on the network optimization algorithm, efficiency of determining the network optimization policy is effectively improved. In addition, when the network optimization policy is determined, the performance parameter of the network is further considered. Therefore, the determined network optimization policy can adapt to a dynamic change of network performance. Therefore, when the network performance dynamically changes, it can also be ensured that the transmission performance of the target service flow satisfies the service requirement.

When the transmission performance of the target service flow cannot satisfy the service requirement due to deterioration of the network performance, the network optimization device can improve the transmission performance of the target service flow by adjusting a parameter value of a network optimization technology, switching a type of the network optimization technology, and/or superimposing another network optimization technology, to ensure that the service requirement of the target service flow is satisfied. When the network performance is improved, the network optimization device can release a resource of a network device by adjusting the parameter value of the network optimization technology or disabling the network optimization technology, to improve resource utilization of the network device.

Figure 11:
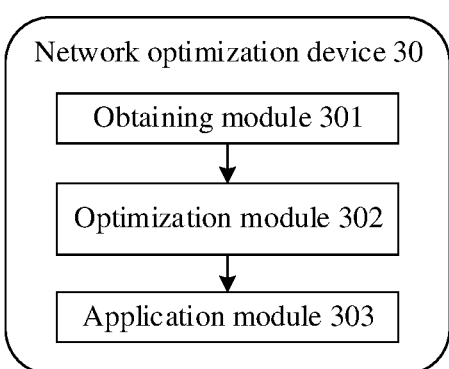
FIG. 11 is a schematic diagram of a structure of a network optimization device according to an embodiment of this application.

An embodiment of this application further provides a network optimization device. The network optimization device may be applied to the system shown in FIG. 1, FIG. 3, FIG. 4, FIG. 9, or FIG. 10, and may be configured to implement the method provided in the foregoing method embodiment. As shown in FIG. 11, the network optimization device 30 includes: an obtaining module 301, an optimization module 302, and an application module 303.

The obtaining module 301 is configured to obtain a performance parameter of a network. For function implementation of the obtaining module 301, refer to related descriptions of step 101 in the foregoing method embodiment.

The optimization module 302 is configured to process an input parameter by using a network optimization algorithm, to obtain a target network optimization policy, where the input parameter includes the performance parameter of the network and a service requirement of a target service flow. For function implementation of the optimization module 302, refer to related descriptions of step 103 in the foregoing method embodiment.

The application module 303 is configured to apply the target network optimization policy to the target service flow, to enable transmission performance of the target service flow in the network to satisfy the service requirement. For function implementation of the application module 303, refer to related descriptions of step 104 in the foregoing method embodiment.

Optionally, the obtaining module 301 is configured to obtain a performance parameter of a link through which the target service flow is to pass in the network.

Optionally, the optimization module 302 may be configured to select at least one network optimization technology from a plurality of different network optimization technologies, to obtain the target network optimization policy.

Optionally, the input parameter further includes: first temporary transmission performance of the target service flow obtained after a temporary network optimization technology is applied to the target service flow, where the temporary network optimization technology belongs to the plurality of different network optimization technologies; and the optimization module 302 may be configured to select, from the plurality of different network optimization technologies if the first temporary transmission performance does not satisfy the service requirement, at least one network optimization technology different from the temporary network optimization technology, to obtain the target network optimization policy.

Optionally, the optimization module 302 may be configured to process the input parameter by using the network optimization algorithm, to select a group of parameter values from a parameter value range of a network optimization technology, to obtain the target network optimization policy.

Optionally, the input parameter further includes: second temporary transmission performance of the target service flow obtained after the network optimization technology whose parameter value is a first temporary parameter value is applied to the target service flow; and the optimization module 302 may be configured to adjust, if the second temporary transmission performance does not satisfy the service requirement, the first temporary parameter value within the parameter value range of the network optimization technology, to obtain the target network optimization policy.

Optionally, the input parameter further includes: third temporary transmission performance of the target service flow obtained after the network optimization technology whose parameter value is a second temporary parameter value is applied to the target service flow; and the optimization module 302 may be configured to adjust, if the third temporary transmission performance is higher than the service requirement, the second temporary parameter value within the parameter value range of the network optimization technology, to obtain the target network optimization policy, where device resources required for executing the network optimization technology whose parameter value is the second temporary parameter value are more than device resources required for executing the target network optimization policy.

Optionally, the input parameter further includes: resource use information of a network device configured to execute the target network optimization policy; and the resource use information is used to make device resources of the network device abundant to execute the target network optimization policy. For function implementation of the obtaining module 301, further refer to related descriptions of step 102 in the foregoing method embodiment.

Optionally, the optimization module 302 may be configured to input the network performance parameter and the service requirement into an optimization model, to obtain one or more different network optimization technologies output by the optimization model, where the target network optimization policy is determined from the one or more different network optimization technologies.

Optionally, the optimization model is obtained by performing training on training samples, and the training samples include: a reference network optimization policy, a performance parameter of the network before the reference network optimization policy is applied to a reference service flow, and transmission performance of the reference service flow obtained after the reference network optimization policy is applied to the reference service flow.

In a possible implementation, the network optimization device 30 may be a controller, and the application module 303 may be configured to deliver the target network optimization policy to the network device configured to execute the target network optimization policy. The obtaining module 301 may be the information receiving module in the foregoing embodiments.

In another possible implementation, the network optimization device 30 may be the network device configured to execute the target network optimization policy, and the application module 303 may be configured to execute the target network optimization policy on the target service flow. The obtaining module 301 may be the information collection module in the foregoing embodiments.

In conclusion, an embodiment of this application provides a network optimization device. The network optimization device can process a performance parameter of a network and a service requirement of a target service flow by using a network optimization algorithm, to obtain a target network optimization policy, and can apply the target network optimization policy to the target service flow, to enable transmission performance of the target service flow to satisfy the service requirement. Because the network optimization device can automatically determine the network optimization policy based on the network optimization algorithm, efficiency of determining the network optimization policy is effectively improved. In addition, when the network optimization policy is determined, the performance parameter of the network is further considered. Therefore, the determined network optimization policy can adapt to a dynamic change of network performance. Therefore, when the network performance dynamically changes, it can also be ensured that the transmission performance of the target service flow satisfies the service requirement.

A person skilled in the art may clearly understand that, for the specific operating processes of the network optimization device and each module described above, reference may be made to the corresponding process in the foregoing method embodiment for the convenience and conciseness of the description, and no further details are provided herein again.

It should be understood that the network optimization device provided in this embodiment of this application may be implemented by using an application-specific integrated circuit (ASIC), or a programmable logic device (PLD). The PLD may be a complex programmable logic device (CPLD), a field-programmable gate array (FPGA), a generic array logic (GAL), or any combination thereof. Alternatively, the method for determining a network optimization policy provided in the foregoing method embodiment may be implemented by using software. When the method for determining a network optimization policy provided in the foregoing method embodiment is implemented by using software, the modules in the foregoing network optimization device may alternatively be software modules.

Figure 12:
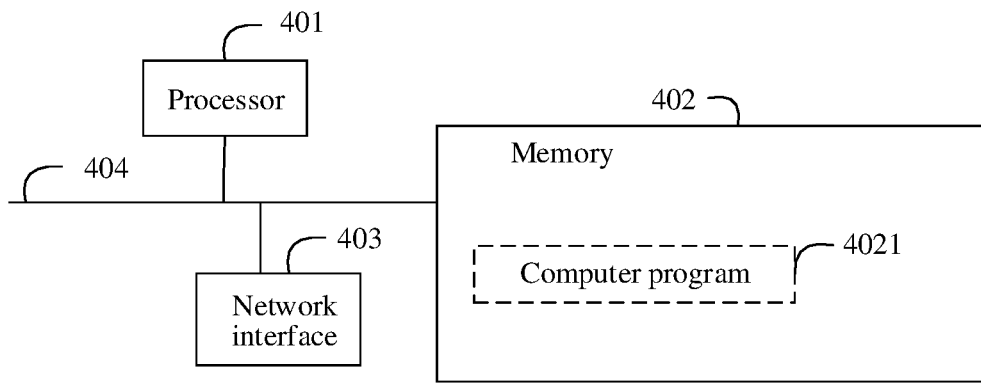
FIG. 12 is a schematic diagram of a structure of another network optimization device according to an embodiment of this application.

FIG. 12 is a schematic diagram of a structure of another network optimization device according to an embodiment of this application. The network optimization device may be applied to the system shown in FIG. 1, FIG. 3, FIG. 4, FIG. 9, or FIG. 10, and may be configured to implement the method provided in the foregoing method embodiment. Referring to FIG. 12, the network optimization device may include: a processor 401, a memory 402, a network interface 403, and a bus 404. The bus 404 is configured to connect the processor 401, the memory 402, and the network interface 403. A communication connection to another device may be implemented by using the network interface 403 (which may be wired or wireless). The memory 402 stores a computer program 4021, and the computer program 4021 is used to implement various application functions.

It should be understood that, in this embodiment of this application, the processor 401 may be a CPU, or the processor 401 may be another general-purpose processor, a digital signal processor (DSP), an application-specific integrated circuit (ASIC), a field-programmable gate array (FPGA), a generic array logic (GAL) or another programmable logic device, a discrete gate or a transistor logic device, a discrete hardware component, or any combination of the foregoing processors. The general-purpose processor may be a microprocessor, any conventional processor, or the like.

The memory 402 may include a volatile memory, a non-volatile memory, or a combination thereof. The non-volatile memory may include a read-only memory (ROM), a programmable read-only memory (programmable ROM, PROM), an erasable programmable read-only memory (erasable PROM, EPROM), an electrically erasable programmable read-only memory (electrically EPROM, EEPROM), a flash memory, or any combination thereof. The volatile memory may include a random access memory (RAM), for example, a static random access memory (static RAM, SRAM), a dynamic random access memory (DRAM), a synchronous dynamic random access memory (synchronous DRAM, SDRAM), a double data rate synchronous dynamic random access memory (double Data Rate SDRAM, DDR SDRAM), an enhanced synchronous dynamic random access memory (enhanced SDRAM, ESDRAM), a synchlink dynamic random access memory (synchlink DRAM, SLDRAM), a direct rambus random access memory (direct rambus RAM, DR RAM), or any combination thereof.

The bus 404 may further include a power bus, a control bus, a status signal bus, and the like, in addition to a data bus. However, for the purpose of clear descriptions, various buses are all marked as the bus 404 in the figure.

The processor 401 may be configured to execute the computer program 4021 stored in the memory 402, to implement the method for determining a network optimization policy provided in the foregoing method embodiment.

Figure 13:
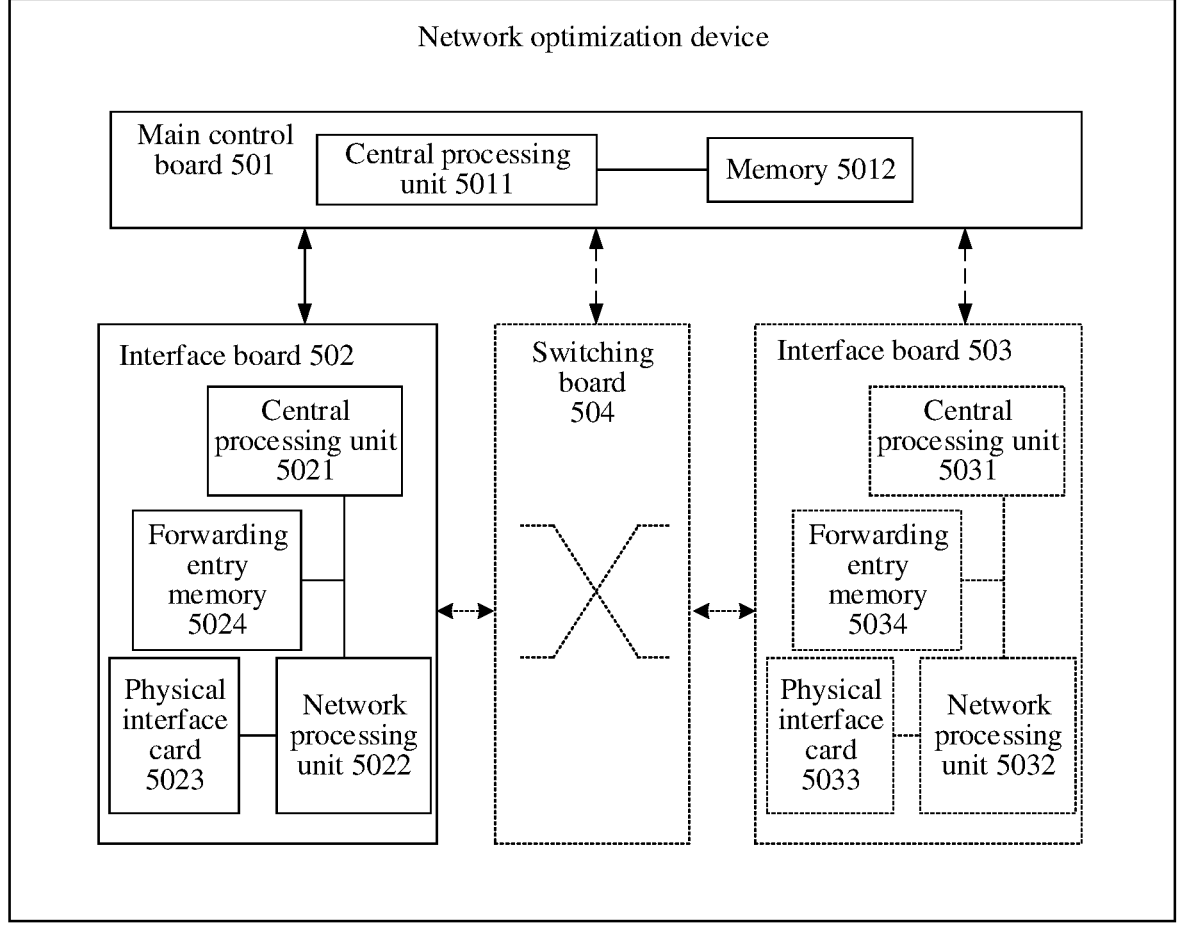
FIG. 13 is a schematic diagram of a structure of still another network optimization device according to an embodiment of this application.

FIG. 13 is a schematic diagram of a structure of still another network optimization device according to an embodiment of this application. The network optimization device may be applied to the system shown in FIG. 1, FIG. 3, FIG. 4, FIG. 9, or FIG. 10, and may be configured to implement the method provided in the foregoing method embodiment. As shown in FIG. 13, the network optimization device includes a main control board 501 and an interface board 502.

The main control board 501 is also referred to as a main processing unit (MPU) or a route processor card. The main control board 501 is configured to control and manage each component in the network optimization device, including functions such as route calculation, device management, device maintenance, and protocol processing. The main control board 501 includes a central processing unit 5011 and a memory 5012.

The interface board 502 is also referred to as a line interface unit card (LPU), a line card, or a service board. The interface board 502 is configured to provide various service interfaces and forward a service frame. The service interfaces include but are not limited to an Ethernet interface, a SONET/SDH-based service frame (packet over SONET/SDH, POS) interface, and the like. SONET refers to Synchronous Optical Network, and SDH refers to Synchronous Digital Hierarchy. The Ethernet interface is, for example, a flexible Ethernet service interface (flexible Ethernet clients, FlexE Clients). The interface board 502 includes a central processing unit 5021, a network processing unit 5022, a forwarding entry memory 5024, and a physical interface card(PIC) 5023.

The central processing unit 5021 on the interface board 502 is configured to control and manage the interface board 502 and communicate with the central processing unit 5011 on the main control board 501.

The network processing unit 5022 is configured to implement packet forwarding processing. A form of the network processing unit 5022 may be a forwarding chip. The forwarding chip may be a network processing unit (NP). In some embodiments, the forwarding chip may be implemented by using an ASIC or an FPGA. Specifically, the network processing unit 5022 is configured to forward a received packet based on a forwarding table stored in the forwarding entry memory 5024, and send, if a destination address of the packet is an address of the network optimization device, the packet to a CPU (for example, the central processing unit 5021) for processing; and search, if the destination address of the packet is not the address of the network optimization device, the forwarding table based on the destination address to find a next hop and an outbound interface that correspond to the destination address, and forward the packet to the outbound interface corresponding to the destination address. Processing of an uplink packet may include: processing of a packet inbound interface, and lookup of the forwarding table. Processing of a downlink packet may include: lookup of the forwarding table, and the like. In some embodiments, the central processing unit may also perform a function of the forwarding chip, for example, implement software forwarding based on a general-purpose CPU, so that the forwarding chip is not required in the interface board.

The physical interface card 5023 is configured to implement an interconnection function of a physical layer. From the physical interface card 5023, original traffic enters the interface board 502 and a processed packet is sent. The physical interface card 5023 is also referred to as a sub-card, may be installed on the interface board 502, and is responsible for converting an optical/electrical signal into a packet, performing a validity check on the packet, and then forwarding the packet to the network processing unit 5022 for processing. In some embodiments, the central processing unit 5021 may also execute a function of the network processing unit 5022, for example, implement software forwarding based on a general-purpose CPU, so that the network processing unit 5022 is not required in the physical interface card 5023.

Optionally, the network optimization device includes a plurality of interface boards. For example, the network optimization device further includes an interface board 503. The interface board 503 includes a central processing unit 5031, a network processing unit 5032, a forwarding entry memory 5034, and a physical interface card 5033. Functions and implementations of components in the interface board 503 are the same as or similar to those of the interface board 502, and details are not described herein again.

Optionally, the network optimization device further includes a switching board 504. The switching board 504 may also be referred to as a switch fabric unit (switch fabric unit, SFU). When the network management device has a plurality of interface boards, the switching board 504 is configured to complete data exchange between the interface boards. For example, the interface board 502 and the interface board 503 may communicate with each other by using the switching board 504.

The main control board 501 is coupled to the interface boards. For example, the main control board 501, the interface board 502, the interface board 503, and the switching board 504 are connected to a system backplane by using a system bus to implement interworking. In a possible implementation, an inter-process communication (inter-process communication, IPC) channel is established between the main control board 501 and each of the interface board 502 and the interface board 503, and the main control board 501 communicates with each of the interface board 502 and the interface board 503 by using the IPC channel.

Logically, the network optimization device includes a control plane and a forwarding plane, the control plane includes the main control board 501 and the central processing unit 5011, and the forwarding plane includes components for performing forwarding, such as the forwarding entry memory 5024, the physical interface card 5023, and the network processing unit 5022. The control plane performs functions such as a router, generating the forwarding table, processing signaling and a protocol packet, and configuring and maintaining a status of a network device. The control plane delivers the generated forwarding table to the forwarding plane. On the forwarding plane, the network processing unit 5022 performs table lookup based on the forwarding table delivered by the control plane and forwards the packet received by the physical interface card 5023. The forwarding table delivered by the control plane may be stored in the forwarding entry memory 5024. In some embodiments, the control plane and the forwarding plane may be completely separated, and are not on a same network device.

It should be noted that, there may be one or more main control boards. When there are a plurality of main control boards, the main control boards may include an active main control board and a standby main control board. There may be one or more interface boards. A stronger data processing capability of the network management device indicates more interface boards provided. There may also be one or more physical interface cards on an interface board. There may be no, one, or more switching boards. When there are a plurality of switching boards, the switching boards may jointly implement load sharing and redundancy backup. In a centralized forwarding architecture, the network management device may require no switching board, and an interface board provides a function of processing service data of an entire system. In a distributed forwarding architecture, the network management device may have at least one switching board, and data exchange between a plurality of interface boards is implemented by using the switching board, to provide a large-capacity data exchange and processing capability. Therefore, a data access and processing capability of the network management device in the distributed architecture is stronger than that of the network management device in the centralized architecture. Optionally, a form of the network management device may alternatively be only one card, that is, there is no switching board, and functions of the interface board and the main control board are integrated on the card. In this case, the central processing unit on the interface board and the central processing unit on the main control board may be combined into one central processing unit on the card, to perform a function obtained after the two central processing units are superimposed. In this form, a data switching and processing capability of the network management device is weak (for example, a network device such as a low-end switch or router). A specific architecture that is to be used depends on a specific networking deployment scenario. This is not limited herein.

An embodiment of this application further provides a computer-readable storage medium. The computer-readable storage medium stores an instruction, and the instruction is executed by a processor to implement the method for determining a network optimization policy provided in the foregoing method embodiment.

An embodiment of this application further provides a computer program product including an instruction. When the computer program product is run on a computer, the computer is enabled to perform the method for determining a network optimization policy provided in the foregoing method embodiment.

An embodiment of this application further provides a traffic forwarding system. As shown in FIG. 1, FIG. 4, and FIG. 10, the system includes: a controller 01 and a first network device 02. For a structure of the controller 01, refer to FIG. 11 to FIG. 13. The controller 01 is configured to perform the method for determining a network optimization policy provided in the foregoing method embodiment. The first network device 02 is configured to execute, on a target service flow, a network optimization policy determined by the controller 01. For example, the traffic forwarding system may be a wide area network, and the first network device 02 may be an AR.

All or some of the foregoing embodiments may be implemented by using software, hardware, firmware, or any combination thereof. When software or firmware is used to implement the embodiments, all or some of the foregoing embodiments may be implemented in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website mobile terminal, computer, server, or data center to another website mobile terminal, computer, server, or data center in a wired (for example, a coaxial cable, an optical fiber, or a twisted pair) or wireless (for example, infrared, radio, or microwave) manner. The computer-readable storage medium may be any medium accessible by a computer, or a data storage device, such as a server or a data center, integrating one or more media. The medium may be a magnetic medium (for example, a floppy disk, a hard disk, or a magnetic tape), an optical medium (for example, an optical disc), or a semiconductor medium. The semiconductor medium may be a solid state drive (SSD).

In this application, the term "at least one" means one or more, and the term "a plurality of" means two or more. In this specification, the terms "system" and "network" may be often used interchangeably. "And/or" mentioned in this specification represents that three relationships may exist. For example, A and/or B may represent the following three cases: only A exists, both A and B exist, and only B exists. The character "/" usually indicates an "or" relationship between the associated objects.

The foregoing descriptions are merely optional embodiments of this application, and are not intended to limit this application. The protection scope of this application is subject to the claims.

What is claimed is:

1. A method for determining a network optimization policy, wherein the method comprises:

obtaining a performance parameter of a network;

selecting at least one network optimization technology from a plurality of different network optimization technologies by processing an input parameter using a network optimization algorithm, to obtain a target network optimization policy comprising at least one parameter value of a parameter value range of a network optimization technology selected by the network optimization algorithm, wherein the input parameter comprises the performance parameter of the network and a service requirement of a target service flow in the network, and wherein the plurality of different network optimization technologies includes at least two of a forward error correction (FEC) technology, a compression technology, a multi-feed and selective receiving technology, a per-packet load sharing technology, a jitter buffer technology, an active lost packet retransmission technology, or a transmission control protocol (TCP) acceleration technology; and applying the target network optimization policy to the target service flow, to enable transmission performance of the target service flow in the network to satisfy the service requirement.

2. The method according to claim 1, wherein the obtaining the performance parameter of the network comprises:

obtaining a performance parameter of a link through which the target service flow is to pass in the network.

3. The method according to claim 1, wherein the processing the input parameter comprises:

processing the input parameter using the network optimization algorithm, to select at least one network optimization technology, including the network optimization technology, from a plurality of different network optimization technologies, to obtain the target network optimization policy.

4. The method according to claim 3, wherein the input parameter further comprises first temporary transmission performance of the target service flow obtained after a temporary network optimization technology is applied to the target service flow, wherein the temporary network optimization technology belongs to the plurality of different network optimization technologies; and wherein the selecting at least one network optimization technology from a plurality of different network optimization technologies, to obtain the target network optimization policy comprises:

selecting, from the plurality of different network optimization technologies, in response to the first temporary transmission performance not satisfying the service requirement, at least one network optimization technology different from the temporary network optimization technology, to obtain the target network optimization policy.

5. The method according to claim 1, wherein the processing the input parameter comprises:

processing the input parameter by using the network optimization algorithm, to select a group of parameter values from the parameter value range of the network optimization technology, to obtain the target network optimization policy.

6. The method according to claim 5, wherein the input parameter further comprises:

second temporary transmission performance of the target service flow obtained after the network optimization technology whose parameter value is a first temporary parameter value is applied to the target service flow; and wherein the selecting the group of parameter values from the parameter value range of the network optimization technology, to obtain the target network optimization policy comprises:

adjusting, in response to the second temporary transmission performance not satisfying the service requirement, the first temporary parameter value within the parameter value range of the network optimization technology to obtain the target network optimization policy.

7. The method according to claim 5, wherein the input parameter further comprises:

third temporary transmission performance of the target service flow obtained after the network optimization technology whose parameter value is a second temporary parameter value is applied to the target service flow; and wherein the selecting the group of parameter values, including the at least one parameter value, from the parameter value range of the network optimization technology, to obtain the target network optimization policy comprises:

when the third temporary transmission performance is higher than the service requirement, adjusting the second temporary parameter value within the parameter value range of the network optimization technology to obtain the target network optimization policy, wherein device resources required for executing the network optimization technology whose parameter value is the second temporary parameter value are more than device resources required for executing the target network optimization policy.

8. The method according to claim 1, wherein the input parameter further comprises resource use information of a network device configured to execute the target network optimization policy; and wherein the resource use information is associated with making device resources of the network device available for execution of the target network optimization policy.

9. The method according to claim 1, wherein the processing the input parameter comprises:

inputting the performance parameter and the service requirement into an optimization model, to obtain one or more different network optimization technologies output by the optimization model, wherein the target network optimization policy is determined from the one or more different network optimization technologies.

10. The method according to claim 9, wherein the optimization model is obtained by performing training on training samples, and wherein the training samples comprise a reference network optimization policy, wherein a performance parameter of the network before the reference network optimization policy is applied to a reference service flow, and wherein transmission performance of the reference service flow obtained after the reference network optimization policy is applied to the reference service flow.

11. The method according to claim 1, wherein the method for determining the network optimization policy is applied to a network optimization device, and wherein the network optimization device is a controller, and wherein the applying the target network optimization policy to the target service flow comprises:

delivering the target network optimization policy to a network device configured to execute the target network optimization policy.

12. The method according to claim 1, wherein the method for determining the network optimization policy is applied to a network optimization device, and wherein the applying the target network optimization policy to the target service flow comprises:

executing the target network optimization policy on the target service flow.

13. A network optimization device comprising:

a non-transitory memory;

a processor; and a computer program stored on the non-transitory memory and executable by the processor, wherein the computer program comprises instructions that, when executed by the processor, enable the network optimization device to:

obtain a performance parameter of a network;

selecting at least one network optimization technology from a plurality of different network optimization technologies by processing an input parameter using a network optimization algorithm, to obtain a target network optimization policy comprising at least one parameter value of a parameter value range of a network optimization technology selected by the network optimization algorithm, wherein the input parameter comprises the performance parameter of the network and a service requirement of a target service flow in the network, and wherein the plurality of different network optimization technologies includes at least two of a forward error correction (FEC) technology, a compression technology, a multi-feed and selective receiving technology, a per-packet load sharing technology, a jitter buffer technology, an active lost packet retransmission technology, or a transmission control protocol (TCP) acceleration technology; and apply the target network optimization policy to the target service flow, to enable transmission performance of the target service flow in the network to satisfy the service requirement.

14. The device according to claim 13, wherein the computer program comprises further instructions that, when executed by the processor, enable the network optimization device to:

obtain a performance parameter of a link through which the target service flow is to pass in the network.

15. The device according to claim 13, wherein the computer program comprises further instructions that, when executed by the processor, enable the network optimization device to:

process the input parameter by using the network optimization algorithm, to select at least one network optimization technology including the network optimization technology, from a plurality of different network optimization technologies, to obtain the target network optimization policy.

16. The device according to claim 15, wherein the input parameter further comprises first temporary transmission performance of the target service flow obtained after a temporary network optimization technology is applied to the target service flow, wherein the temporary network optimization technology belongs to the plurality of different network optimization technologies; and wherein the computer program comprises further instructions that, when executed by the processor, further enable the network optimization device to:

select, from the plurality of different network optimization technologies, in response to the first temporary transmission performance not satisfying the service requirement, at least one network optimization technology different from the temporary network optimization technology, to obtain the target network optimization policy.

17. The device according to claim 13, wherein the computer program comprises further instructions when executed by the processor further enable the network optimization device to:

process the input parameter using the network optimization algorithm, to select a group of parameter values from the parameter value range of the network optimization technology, to obtain the target network optimization policy.

18. The device according to claim 17, wherein the input parameter further comprises second temporary transmission performance of the target service flow obtained after the network optimization technology whose parameter value is a first temporary parameter value is applied to the target service flow; and wherein the computer program comprises further instructions that, when executed by the processor, further enable the network optimization device to:

when the second temporary transmission performance does not satisfy the service requirement, adjust the first temporary parameter value within the parameter value range of the network optimization technology, to obtain the target network optimization policy.

19. The device according to claim 17, wherein the input parameter further comprises third temporary transmission performance of the target service flow obtained after the network optimization technology whose parameter value is a second temporary parameter value is applied to the target service flow; and wherein the computer program comprises further instructions that, when executed by the processor further, enable the network optimization device to:

adjust, in response to the third temporary transmission performance being higher than the service requirement, the second temporary parameter value within the parameter value range of the network optimization technology, to obtain the target network optimization policy, wherein device resources required for executing the network optimization technology whose parameter value is the second temporary parameter value are more than device resources required for executing the target network optimization policy.

20. The device according to claim 13, wherein the input parameter further comprises resource use information of a network device configured to execute the target network optimization policy; and wherein the resource use information is associated with making device resources of the network device available for execution of the target network optimization policy.

* * * * *